(12) United States Patent
Hasunuma (10) Patent No.: US 7,887,023 B2
(45) Date of Patent: Feb. 15, 2011

(54) FLUID-TRANSFER COUPLING DEVICE (75) Inventor: Masahiro Hasunuma, Gyoda (JP)

(73) Assignee: Surpass Industry Co., Ltd., Saitama (JP)

( * ) Notice: Subject to any disclaimer, the term of this patent is extended or adjusted under 35 U.S.C. 154(b) by 110 days.

(21) Appl. No.: 12/373,131

(22) PCT Filed: Jun. 27, 2007

(86) PCT No.: PCT/JP2007/063331

§ 371 (c)(1),
(2), (4) Date: Jan. 9, 2009

(87) PCT Pub. No.: WO2008/007585

PCT Pub. Date: Jan. 17, 2008

(65) Prior Publication Data

US 2010/0001517 A1    Jan. 7, 2010

(30) Foreign Application Priority Data

Jul. 10, 2006   (JP)   .............................. 2006-189710

(51) Int. Cl.
*F16L 37/18* (2006.01)
(52) U.S. Cl. .............................. 251/149.9; 137/614.06
(58) Field of Classification Search ................ 137/614, 137/614.03–614.06; 251/149.1, 149.6, 149.9
See application file for complete search history.

(56) References Cited

U.S. PATENT DOCUMENTS

| | | | |
|---|---|---|---|
| 4,540,021 A | 9/1985 | Rogers | |
| 4,592,387 A | 6/1986 | Rogers | |
| 5,699,831 A | * 12/1997 | Seppanen | ............... 137/614.03 |
| 5,971,019 A | * 10/1999 | Imai | ...................... 137/614.04 |
| 6,217,080 B1 | 4/2001 | Imai | |

FOREIGN PATENT DOCUMENTS

| | | |
|---|---|---|
| JP | 60227094 A | 11/1985 |
| JP | 6262084 A | 3/1987 |
| JP | 3349958 A | 6/1998 |
| JP | 200018458 A | 1/2000 |
| JP | 200018458 W | 1/2000 |
| JP | 2002130574 A | 5/2002 |
| JP | 2002130574 W | 5/2002 |

* cited by examiner

*Primary Examiner*—Kevin L Lee
(74) *Attorney, Agent, or Firm*—Millen, White, Zelano & Branigan, P.C.

(57) ABSTRACT

A fluid-transfer coupling device includes a cylindrical housing (1), a cylindrical slider (25), which contains a valve sleeve (15) accommodating a valve (16) to be opened by pressure and which can slide in the cylindrical housing and plug supporting means (60), which supports a plug (70) on condition of being drawn up to an advanced end in the valve sleeve by the movement of the slider. With this constitution, even when using a coupling device having a relatively-large diameter, it is possible to supply fluid stably. Further the plug supporting means is arranged in front of the forward end of the slider. Additionally, the plug supporting means is provided with an improper connection preventing mechanism (68, 69*a* to 69*d*, 77) for preventing other plugs, except for a specified plug from being connected.

10 Claims, 9 Drawing Sheets

Fig.9d

FLUID-TRANSFER COUPLING DEVICE

TECHNICAL FIELD

The present invention relates to a fluid-transfer coupling device which is used in transferring various liquids (e.g. highly-pure chemical liquids), gas and other fluids, all of which are used in manufacturing semiconductors, from a pharmaceutical manufacturer to a container of a transport truck or transferring them from a transport container to a semiconductor production plant or a FPD (Flat Panel Display) plant.

BACKGROUND OF ART

Generally, a coupling device includes an immovable socket (female coupler) and a movable plug (male coupler) both of which are arranged on an identical axis line. In the coupling device, the plug is inserted into the socket, providing a liquid-tight coupled state between the plug and the socket.

If such a coupling device has a relatively-small diameter, no problems occur when an operator connects the plug to the socket manually. On the contrary, if the coupling device has a relatively-large diameter, then it becomes difficult for an operator to push the plug into the innermost part of the socket in order to complete the connection, since such an operation requires a large amount of force from the operator.

In a coupling device disclosed in Japanese Registered Patent Publication No. 3349958, a plug is first pushed into a socket to some degree by an operator. In succession, through the use of pneumatic pressure, the plug is moved up to an advancing end where it is finally connected to the socket. Thus, according to the technique disclosed in Japanese Registered Patent Publication No. 3349958, even if the coupling device has a relatively-large diameter, the plug and the socket can be connected to each other relatively easily.

However, if supplying fluid (especially, liquid) after connecting the coupling device of a relatively-large diameter, a situation may occur in which the plug may become curved from a joint portion between the plug and the socket due to weight of the fluid. Particularly, in the case of supplying fluid at a relatively-large flow rate, not only does the plug oscillate thereby making it difficult to stably supply fluid, but also the joint portion between the plug and the socket may become damaged. In addition, when supplying multiple chemical liquids, problem arises in which an improper connection is made to the coupling device.

Under the above-mentioned situation, an object of the present invention is to provide a fluid-transfer coupling device that can supply fluid stably even when using the coupling device with a relatively-large diameter. Another object of the present invention is to supply a chemical liquid safely without causing such an improper connection in the coupling device.

DISCLOSURE OF THE INVENTION

In order to attain the above object, according to a first aspect of the present invention, there is provided a fluid-transfer coupling device comprising: a cylindrical slider slidably inserted into a cylindrical housing, the cylindrical slider containing a valve sleeve accommodating a valve which is adapted so as to open by pressure; a piston formed at a rear end of the cylindrical slider so as to make a slide contact with an inner wall of the cylindrical housing, the piston being constructed so that entry and exit of pneumatic pressure on both sides of the piston allows the slider to be moved in the cylindrical housing; engaging means arranged at a forward end of the cylindrical slider so as to engage with a plug to be connected to the cylindrical slider, the engaging means allowing the plug to be drawn up to an advanced end in the valve sleeve with a movement of the cylindrical slider; and plug supporting means for supporting the plug on condition of being drawn up to the advanced end in the valve sleeve by the movement of the cylindrical slider.

According to a second aspect of the invention, there is provided a fluid-transfer coupling device comprising: a cylindrical housing; a cylindrical slider capable of sliding in the cylindrical housing, the cylindrical slider containing a valve sleeve accommodating a valve which is adapted so as to open by pressure; and plug supporting means for supporting a plug on condition of being drawn up to an advanced end in the valve sleeve by a movement of the slider.

Thus, in the first and second aspects, as the plug on condition of being connected to the socket is supported by the plug supporting means, fluid can be supplied stably even if the coupling device is formed with a relatively-large diameter. Therefore, even when supplying the fluid at a relatively-large flow rate, the plug's oscillating is restricted to enable a prevention of the joint portion between the plug and the socket from being damaged.

According to a third aspect of the invention, as in the first or second aspect, the plug supporting means is arranged in further front of the forward end of the slider.

In other words, in the third aspect, even if a relatively-large moment is applied on the plug, it is possible to support the plug stably.

According to a fourth aspect of the invention, as in any of the first to third aspects, the plug supporting means is provided with an improper connection preventing mechanism for preventing other plugs except a specified plug from being connected to the fluid-transfer coupling device.

Thus, in the fourth aspect, as it is possible to prevent the other plug except the specified plug from being connected, the coupling device is especially advantageous in supplying numerous kinds of chemical liquids.

According to a fifth aspect of the invention, as in the fourth aspect, the improper connection preventing mechanism contains at least one key groove previously formed on the outer circumferential face of the above specified plug and a key for engagement with the key groove.

Thus, in the fifth aspect, the improper connection preventing mechanism can be comprised by a relatively-simple mechanism.

According to a sixth aspect of the invention, as in the fifth aspect, the plug supporting means is formed with an opening into which the plug is inserted.

In the sixth aspect, as the plug is inserted into the opening and is connected to the socket. Therefore, it is possible to support the plug to some degree in advance of being connected to the socket completely. Preferably, the plug supporting means comprises a ring-shaped member.

According to a seventh aspect of the invention, as in the fifth or sixth aspect, the key of the improper connection preventing mechanism comprise a tip portion of a bolt projecting from an inner circumferential face of the opening.

In the seventh aspect, the key can be formed by a relatively-simple mechanism.

According to an eighth aspect of the invention, as in any of the third to seventh aspects, the plug supporting means has a taper formed on its edge part opposing the forward end of the slider.

Thus, in the eighth aspect, it is possible to form a clearance enabling an operator to insert operator's fingers between the plug supporting means and the socket in detaching the plug from the socket manually.

According to a ninth aspect of the invention, as in the sixth aspect, the plug supporting means is fixed in at least three positions around the opening.

In other words, in the ninth aspect, it is possible to fix the plug supporting means stably. Further, in inserting the plug into the opening, it is possible to prevent the plug supporting means from being inclined in the inserting direction of the plug.

According to a tenth aspect of the invention, as in any of the first to ninth aspects, the slider is provided with a piston sliding on the inner wall of the cylindrical housing, and the fluid-transfer coupling device further includes a pneumatic pressure entry-and-exit mechanism that changes pneumatic pressures on both sides of the piston thereby to allow the slider to slide in the cylindrical housing.

In other words, in the tenth aspect, even if the coupling device is formed with a relatively-large diameter, it is possible to connect the plug to the socket with ease.

These and other objects, features and advantages of the present invention will become more fully apparent from the detailed description of a typical embodiment of the present invention shown in the accompanying drawings.

BRIEF DESCRIPTION OF THE DRAWINGS

FIG. 9a to FIG. 9d are first to fourth views each showing an inner face of a key plate schematically.

PREFERRED EMBODIMENTS FOR EMBODYING THE INVENTION

An embodiment of the present invention will be described below with reference to the drawings. In the drawings, identical members are indicated with the same reference numerals, respectively. For ease of understanding, these drawings are appropriately modified in terms of their scale sizes.

Figure 1:
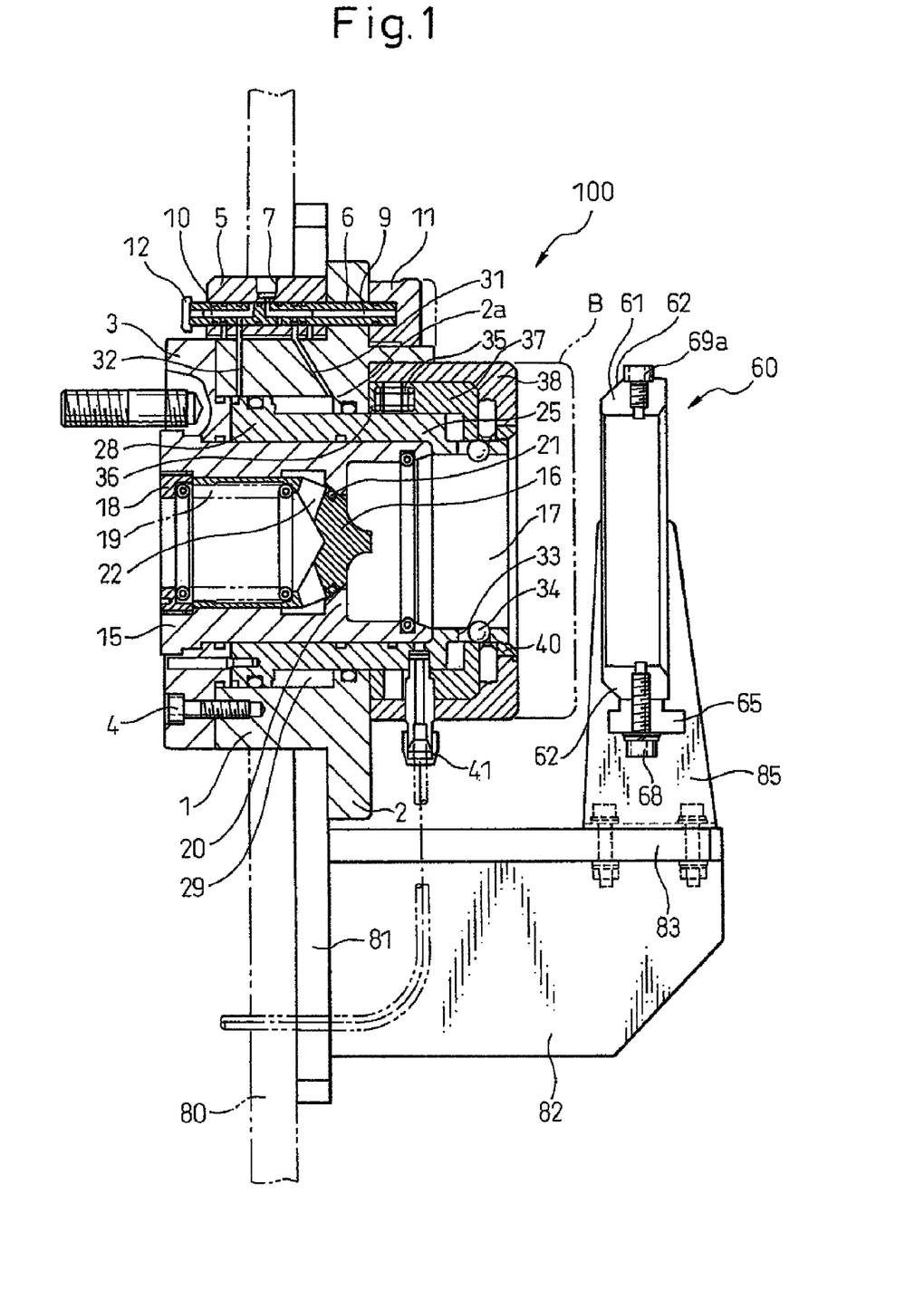
FIG. 1 is a longitudinal sectional view of a fluid-transfer coupling device in accordance with the present invention.

FIG. 1 is a longitudinal sectional view of a fluid-transfer coupling device in accordance with the present invention.

Figure 2A:
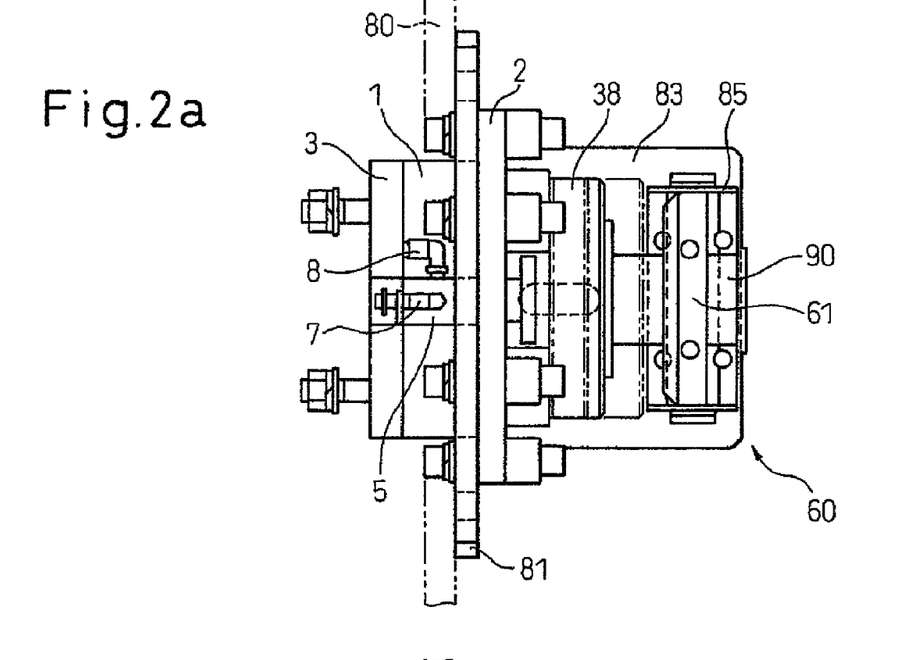
FIG. 2a is a top view of a socket of the fluid-transfer coupling device of FIG. 1.
Figure 2B:
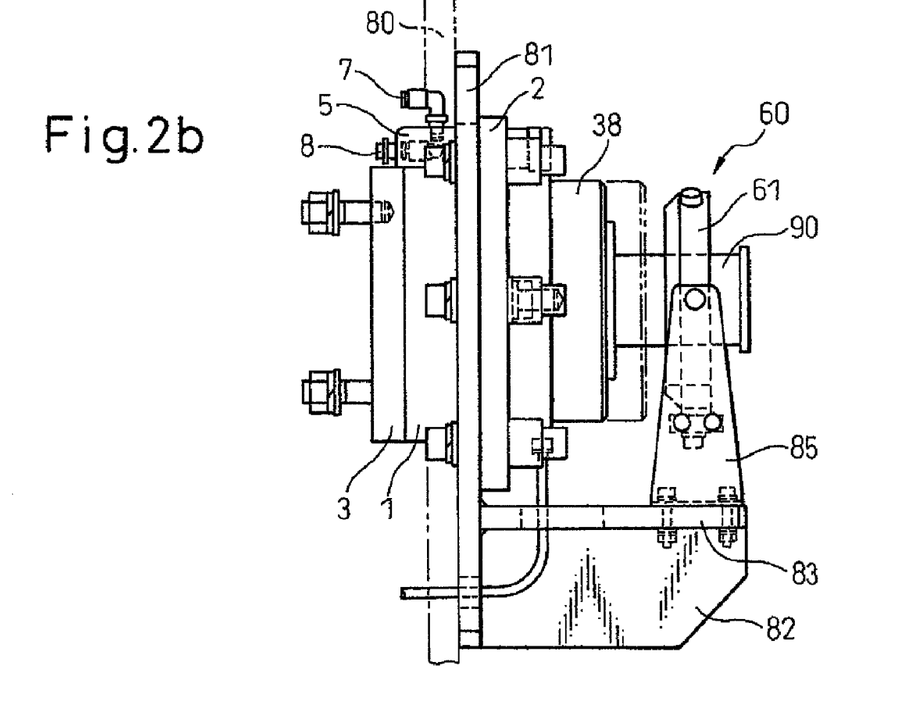
FIG. 2b is a side view of the socket of the fluid-transfer coupling device of FIG. 1.
Figure 3:
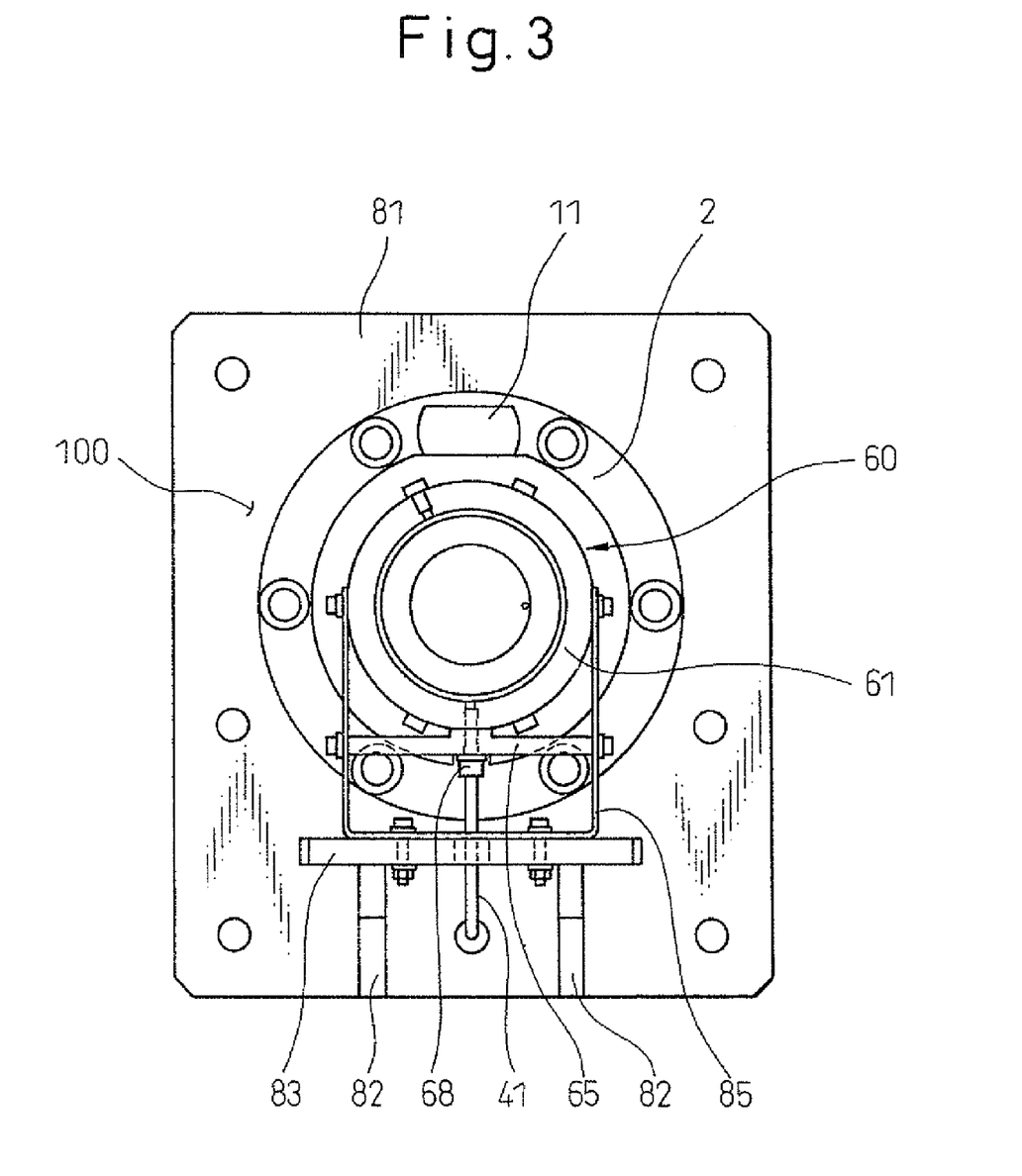
FIG. 3 is a front view of the socket of the fluid-transfer coupling device of FIG. 1.

FIG. 2a and FIG. 2b are top and side views of a socket of the fluid-transfer coupling device of FIG. 1. Further, FIG. 3 is a front view of the socket of the fluid-transfer coupling device of FIG. 1.

As shown in FIG. 1, the socket 100 of the coupling device includes a housing 1 provided, on one end thereof, with a flange 2. The other end of the housing 1 is fixed to an annular base 3 by a plurality of bolts 4. Above the housing 1, there is a shaft housing 5 that is fixed tightly to the flange 2. A shaft 6 is slidably inserted into the shaft housing 5 while penetrating both the shaft housing 5 and the flange 2.

As shown in the figure, the shaft 6 has air passages 9, 10 formed to extend in the axial direction of the shaft 6. The air passages 9, 10 are adapted so as to communicate with either an air supply port 7 or an air exhaust port 8 (see FIGS. 2a and 2b) selectively.

A knob 11 is attached to one end of the shaft 6, while a stopper 12 is attached to the other end of the shaft 6. When an operator pinches the knob 11 to slide the shaft 6 in its axial direction (horizontal direction), the stopper 12 abuts on an end face of the shaft housing 5, so that the sliding action of the shaft 6 is restrained.

As shown in the figure, a valve sleeve 15 accommodating a first valve 16 is inserted into the housing 1 from the side of the annular base 3. The first valve 16 is usually urged by a spring 19 supported by a stopper 18 fitted in an opening 17 of the valve sleeve 15. Consequently, the first valve 16 comes into contact with a first valve seat 20 formed in a forward end of the valve sleeve 15 annularly, via an O-ring 21. Thus, vicinities of the first valve seat 20 (i.e. left and right sides of the seat 20 in FIG. 1) are fluid-tightly sealed.

In a forward end of the first valve 16, one or more communication holes 22 are formed so as to open backward and forward (left and right in FIG. 1) of the holes 22. As mentioned later, when the first valve seat 20 is opened since the first valve 16 is pushed against a pushing force of the spring 19, the opening 17 is communicated with an inside of the first valve 16.

As shown in FIG. 1, a cylindrical slider 25 is slidably fitted on the valve sleeve 15, and is accommodated in the housing 1. The slider 25 is formed, on its rear end, with a piston 28 having slide contact with an inner circumferential face of the housing 1. Further, the flange 2 is formed, on its inner circumferential face, with a narrow part 2a projecting inwardly in the radial direction of the flange 2. Consequently, pneumatic pressure chamber 29 is defined both in front and in the rear of the piston 28, as shown in the figure. In addition, in an inner wall of the housing 1, communication passages 31, 32 are formed so as to communicate the air passages 9, 10 with the pneumatic pressure chamber 29.

A number of ball carrier holes 33 are formed in a narrowed forward end of the slider 25. These ball carrier holes 33 are tapered so as to enlarge outwardly in the radial direction, carrying balls 34 slightly movably to left and right of FIG. 1.

Outside the slider 25, a plurality of springs 35 (e.g. four springs) are arranged at regular intervals in the circumferential direction. As shown in the figure, these springs 35 are pinched between a spring shoe 36 fixed to the slider 25 and a movable inner collar 37. Additionally, a sleeve 38 is slidably fitted on the side of the flange 2 of the housing 1. Owing to the provision of the sleeve 38, the springs 35, the spring shoe 36 and the inner collar 37 are integrated with each other. Further, a stopper 40 is inserted into a gap between the outer circumference of the outer end of the slider 25 and the sleeve 38.

Further, a drain joint 41 for discharging residual liquid in the valve sleeve 15 is arranged on the underside of the socket 100 so as to penetrate the slider 25, the inner collar 37 and the sleeve 38. This drain joint 41 is located between the springs 35 positioned at regular intervals. Note, as shown in the figure, multiple members included in the socket 100 are appropriately provided with seal members, such as O-rings, although their descriptions are eliminated because they are known.

As shown in FIGS. 2a and 2b representatively, according to the present invention, the flange 2 of the socket 100 is attached to a base panel 81 by bolts and nuts. Further, the base panel 81 is mounted on a vertical panel 80 shown with phantom lines of FIG. 1 etc. In other words, the socket 100 of the coupling device of the invention is mounted on the panel 80 via the base panel 81.

As shown in FIG. 1, an attachment base 83 supported by a bracket 82 is attached to a surface of the base panel 81 perpendicularly. In the socket 100 of the coupling device of the present invention, as can be seen from FIGS. 1 and 3 representatively, a plug support 60 supporting a plug 70 of the coupling device is arranged in front of the forward end of the sleeve 30.

Figure 4:
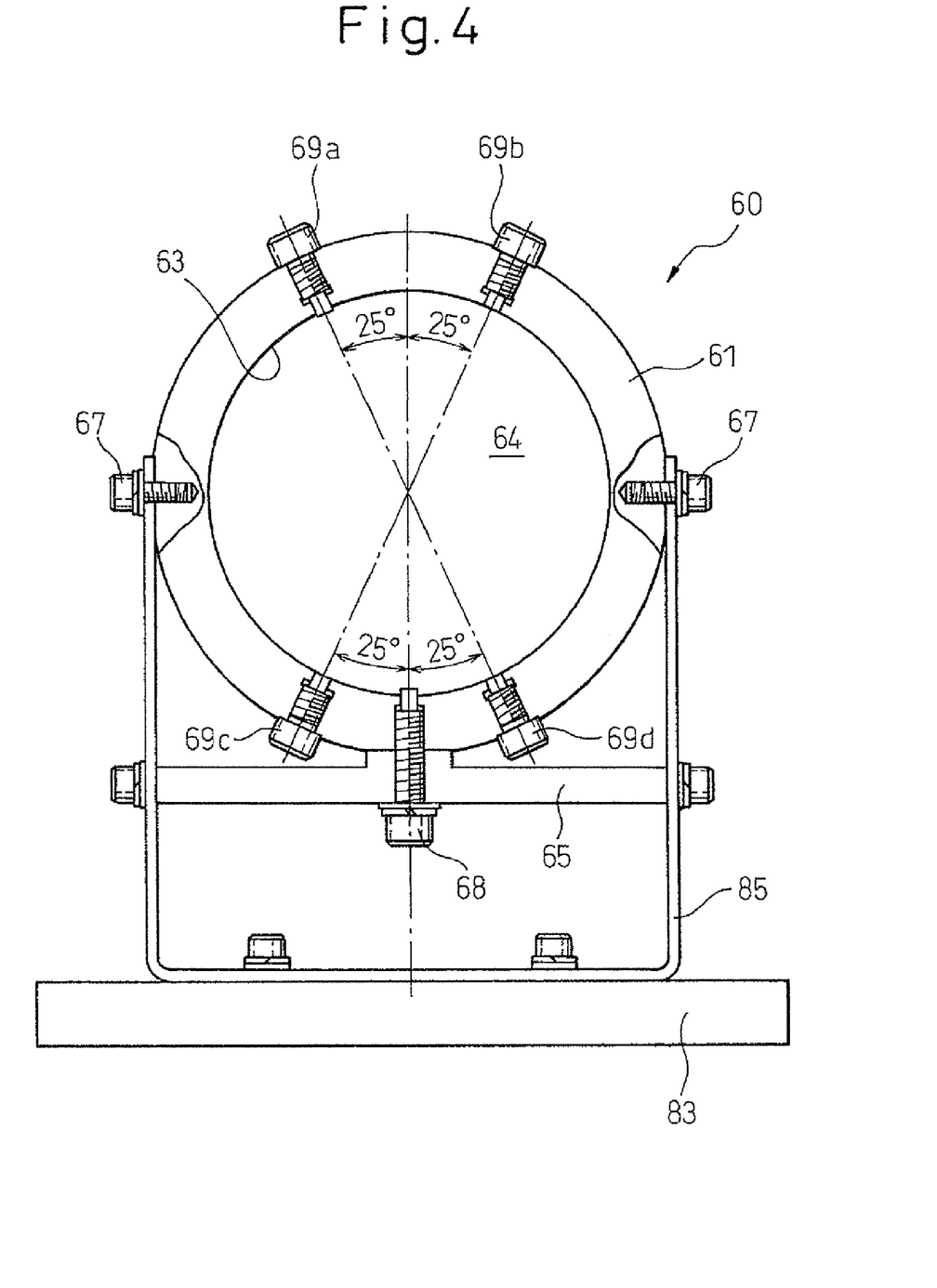
FIG. 4 is a front view of a plug support.

FIG. 4 is a front view of the plug support. As shown in FIG. 4, the plug support 60 includes a generally ring-shaped key plate 61 formed with an opening 64. The inner diameter of the key plate 61 is generally equal to a maximum outer diameter of a cylindrical part of the plug 70. The key plate 61 is made of plastics, for example, vinyl chloride. Both ends of the key plate 61 are fixed to both extensions of a generally U-shaped key plate support 85 by fixing bolts 67. In addition, the key plate support 85 has its bottom part fixed to an attachment base 83 by screws.

In the key plate support 85, the holes for the fixing bolts 67 are shaped so as to be somewhat oblong. Therefore, even after the plug support 60 is attached, it is possible to adjust the position of the plug support 60 within the range of the oblong holes finely and easily.

Additionally, as shown in the figures, a reinforcing bar 65 which connects both extensions of the substantial U-shaped key plate support 85 with each other serves to reinforce the key plate support 85 below the key plate 61. The lower end of the key plate 61 is fixed to an intermediate portion of the reinforcing bar 65 by a first key bolt 68.

Thus, in the present invention, the key plate 61 is supported at three points by two fixing bolts 67 and one first key bolt 68. Accordingly, when the plug 70 is inserted into the opening 64 of the key plate 61, the key plate 61 does not incline to the inserting direction of the plug 70 easily. Preferably, the key plate support 85 and the reinforcing bar 65 are made from metal, for example, SUS (stainless steel). With the formation, it becomes possible to fix the key plate 61 firmly.

As shown in FIG. 4, a plurality of second key bolts (e.g. four key bolts 69a to 69d) extending in the radial direction are attached to the outer circumference of the key plate 61. As shown in the figure, the upper second key bolts 69a, 69b are arranged symmetrically to each other with respect to a vertical plane passing through the center of the key plate 61, at angles of approx. 25 degrees. Similarly, the lower second key bolts 69c, 69d are arranged symmetrically to each other with respect to the above vertical plane passing through the center of the key plate 61, at angles of approx. 25 degrees. Preferably, these second key bolts 69a to 69d are made from metals, for example, SUS (stainless steel).

The first and second key bolts 68, 69a to 69d are formed, on their substantial parts except tip portions, with screw threads. Therefore, these key bolts can be fixed to the key plate 61 at predetermined positions firmly. Note, it is desirable that the first and second key bolts 68, 69a to 69d are produced by preparing existing screws and further deleting screw thread on the tip side from the screws. As a result, the key bolts can be manufactured at a relative low cost.

According to the present invention, it is possible to store, as a stock article, a key plate 61 having holes formed at respective positions for all the key bolts, in advance. Consequently, an operator has only to attach a prescribed number of key bolts to the key plate 61 as occasion demands. In other words, there is no need of storing many different types of key plates that are different from each other in terms of their holes' positions for key bolts, as storage articles. Thus, according to the present invention, it is possible to reduce the number of stock articles and respond the delivery date of the coupling device quickly.

Generally, there have been employed improper connection preventing mechanisms where respective diameters of the plugs and the sockets are different from each other. In this case, as there is a need of storing different types of plugs of different diameters, this improper connection preventing mechanism is accompanied with a problem of increasing the number of stock articles. However, according to the present invention, as the above-mentioned improper connection preventing mechanism (i.e. universal key plate) would be adequate for variations if only altering the number or position of key bolts, it is possible to reduce the number of stock articles in comparison with the conventional improper connection preventing mechanisms.

Figure 5:
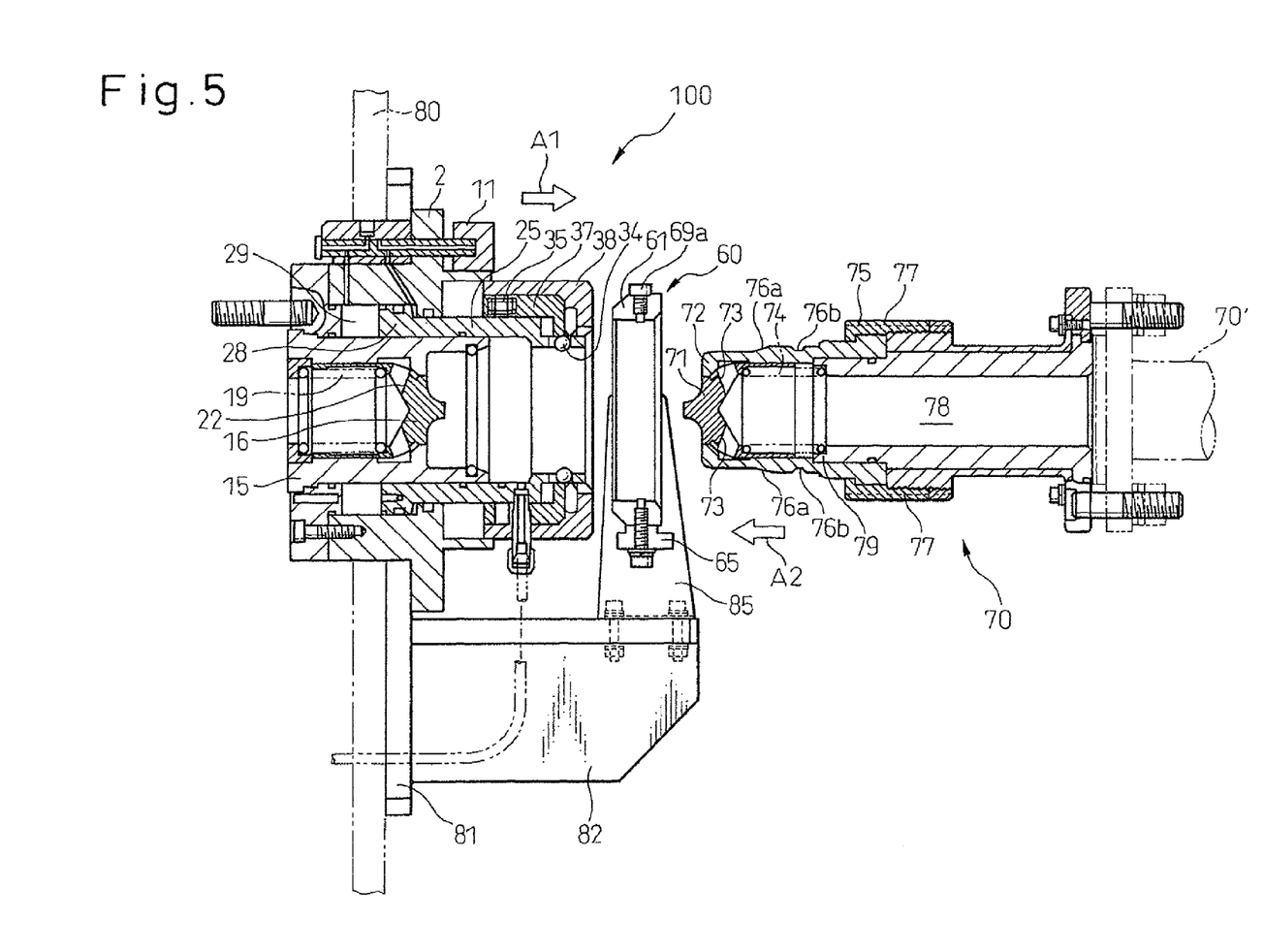
FIG. 5 is a first longitudinal sectional view showing a connecting action between the socket and the plug of the fluid-transfer coupling device in accordance with the present invention.

FIG. 5 is a first longitudinal sectional view showing a connecting action between the socket and the plug of the fluid-transfer coupling device in accordance with the present invention. The plug 70 of the coupling device of the present invention will be described with reference to FIG. 5, in brief.

As can be seen from FIG. 5, the plug 70 is completed by assembling a plurality of components to each other by a double nut 75. The plug 70 is formed with an inner passage 78 communicating with a pipe conduit 70' connected to a base end of the plug 70. An annular recess 76b is formed between a leading end of the plug 70 and the double nut 75. On the outer circumference of the plug 70, an outer slanted face 76a is formed closer to the leading end of the plug 70 than the annular recess 76b.

Further, in the plug 70 of the coupling device of the present invention, the double nut 75 is formed, on its outer circumferential face, with one or more key grooves 77 extending in the axial direction. These key grooves 77 have widths and depths corresponding to respective tips of the first and second key bolts projecting from the inner face 63 of the key plate 61. Owing to the cooperating of the first key bolt 68 and/or the second key bolts 69a to 69d with the key grooves 77, the coupling device of the invention is adapted so as to prevent other plugs different from the specified plug 70 from being connected by mistake. This operation and effect will be described later.

As shown in FIG. 5, the plug 70 is formed, at its leading end, with a second valve seat 72 projecting inwardly in a circular pattern. A spring 74 arranged between the second valve seat 72 and a stopper 79 urges the second valve 71 against the second valve seat 72, so that its opening is closed up by the valve 71. As shown in the figure, the second valve 71 is formed with communication holes 73. When the second valve 71 is pushed against the urging action of the spring 74, the communication holes 73 and the opening of the second valve seat 72 are opened together.

In the coupling device of the present invention, a cap 90 (only shown in FIGS. 2a and 2b) is detached from the opening 17 in advance of joining the plug 70 to the socket 100. When the socket 100 is not used, the cap 90 serves to prevent foreign matter from getting into the socket.

Figure 6:
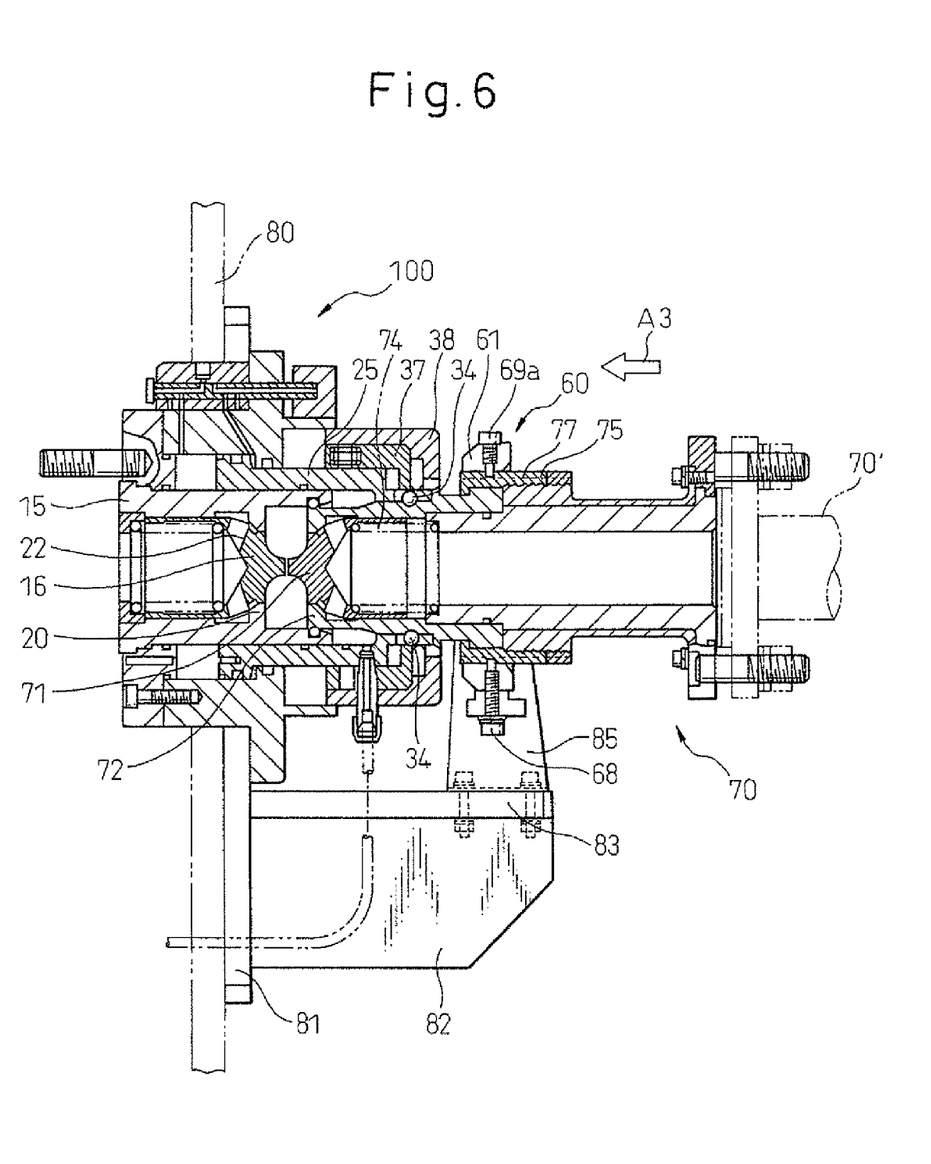
FIG. 6 is a second longitudinal sectional view showing the connecting action between the socket and the plug of the fluid-transfer coupling device in accordance with the present invention.
Figure 8:
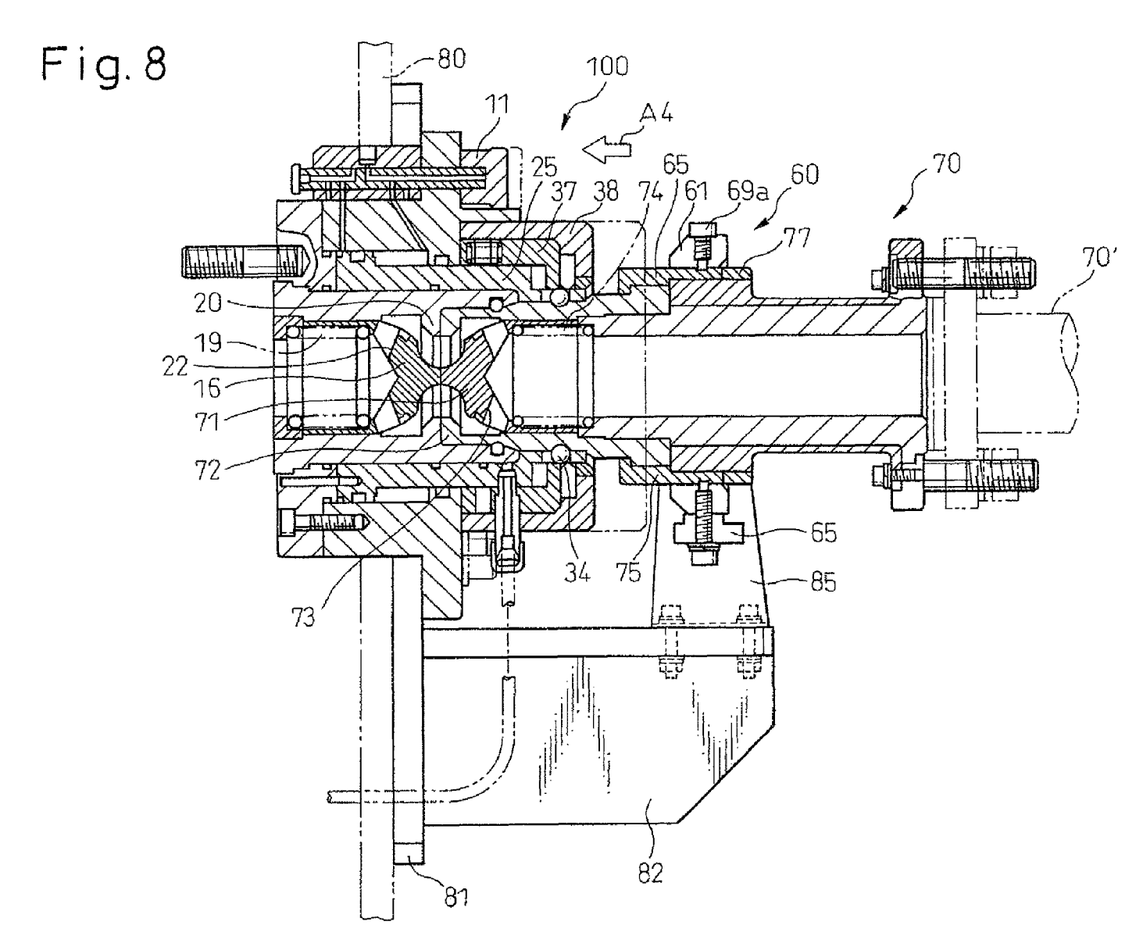
FIG. 8 is a third longitudinal sectional view showing the connecting action between the socket and the plug of the fluid-transfer coupling device in accordance with the present invention.

Referring to FIG. 5 and FIGS. 6 and 8 similar to FIG. 5, the connection action between the socket and the plug in the coupling device of the present invention will be described below. First, as shown with arrow A1 of FIG. 5, it is performed to draw the sleeve 38 together with the slider 25 and the inner collar 37 toward the plug support 60 ahead. Consequently, the leading end of the sleeve 38 is moved to an imaginary line B shown in FIG. 1.

Figure 7A:
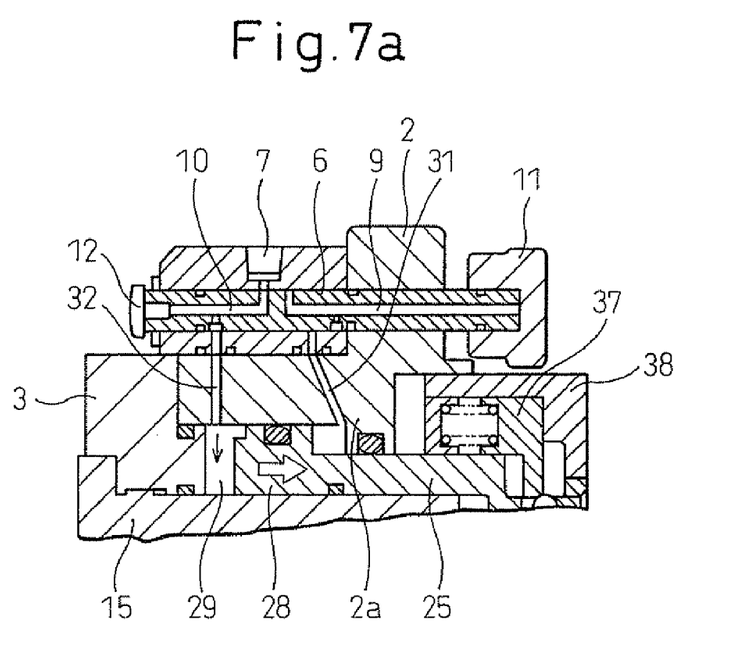
FIG. 7a is a first partially-enlarged view showing a shaft housing in enlargement.

As shown in FIG. 7a being a partially-enlarged view illustrating the shaft housing in enlargement, in the initial state, the shaft 6 is moved to a position where the air supply port 7 communicates with the air passage 10 and the communication passage 32. In this state, the air exhaust port 8 (see FIGS. 2a and 2b) communicates with the air passage 9 and the communication passage 31. In the initial state, assume that no air is supplied through the air supply port 7.

Then, as shown with arrow A2 of FIG. 5, an operator inserts the plug 70 in the opening 64 of the key plate 61, and allows the plug 70 to move toward the socket 100 horizontally. As stated before, since the inner diameter of the key plate 61 generally corresponds to the outer diameter of the plug 70, it is obvious that the plug 70 could be supported to some degree even before the plug 70 is connected to the socket 100 completely.

When further moving the plug 70 with the progressed entry of its leading end in the opening 17 of the socket 100, the outer slanted face 76a of the plug 70 lifts the balls 34. Consequently, the balls 34 push the inner collar 34 against the pressing face of the spring 35.

As shown in FIG. 6, when the plug 70 is further advanced so as to make the inner collar 37 reach its moving end, the balls 34 are conversely pushed by the inner collar 37, and dropped into the annular recess 76b. Consequently, the plug 70 is engaged in the socket 100 temporarily. The above-mentioned operation can be performed by an operator manually, without requiring especially large force.

Figure 7B:
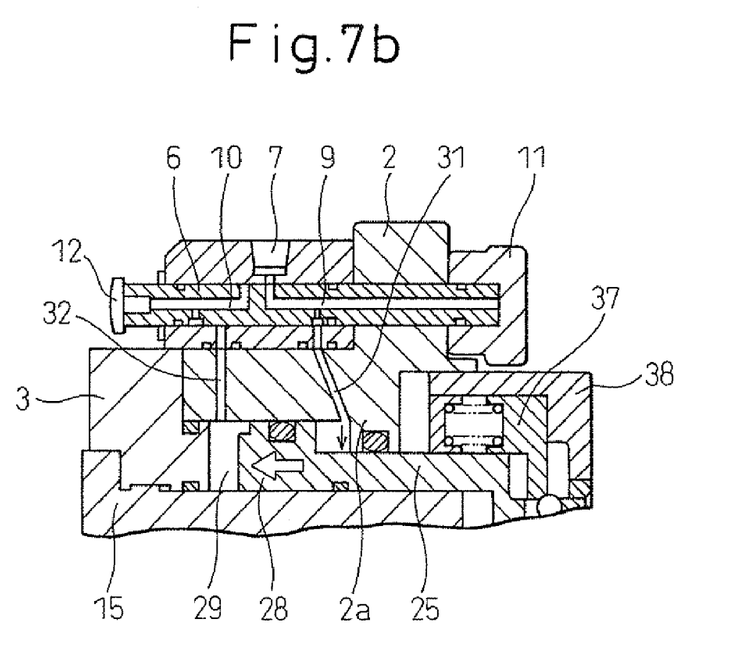
FIG. 7b is a second partially-enlarged view showing the shaft housing in enlargement.

Then, as shown in FIG. 7b, it is performed to press the knob 11 onto the flange 2, allowing the shaft 6 to be slid. As a result, the air supply port 7 is communicated with the air passage 9 and the communication passage 31. In this state, the air exhaust port 8 shown in FIG. 2a etc. communicates with the air passage 10 and the communication passage 32.

If pneumatic pressure is supplied from not-shown air source through the air supply port 7, then the pneumatic pressure is supplied between the piston 28 and the narrow part 2a through the air passage 9 and the communication passage 31. Consequently, as shown with arrow A4 of FIG. 8, the slider 25 retracts in the direction of arrow A4, together with the sleeve 38, the inner collar 37 and the plug 70 integrally.

As a result, as shown in FIG. 8, the first valve 16 and the second valve 71 pushes with each other against the springs 19, 74. Thus, the first valve seat 20 and the second valve seat 72 abut with each other to cause both the communication holes 22 and the communication holes 73 to be opened. The position where the second valve seat 72 abuts on the first valve seat 20 coincides with an advanced end for the plug 70. The moving of the plug 70 up to the advanced end allows the socket 100 of the coupling device to be joined to the plug 70 completely, so that fluid in the pipe conduit 70' flows into the socket 100 through the plug 70.

In the present invention, the plug 70 is supported by the plug support 60 after connecting the coupling device. Thus, even if the coupling device is formed with a relatively-large diameter, it is possible to supply fluid stably. Additionally, even when supplying fluid with a relatively-large flow rate, there is no possibility that the plug 70 supported by the plug support 60 is oscillated. Therefore, according to the present invention, it is possible to prevent a joint portion between the plug 70 and the socket 100 from being damaged due to the oscillation.

As can be seen with reference to FIG. 6 again, the plug support 60 is located in further front of the leading end of the sleeve 38 on condition of being drawn ahead. In other words, the plug support 60 is arranged in a position exerting no influence on the sliding action of the sleeve 38 and the associated slider 25. It will be understood that such a location of the plug support 60 is advantageous of supporting the plug 70 stably when a relatively-large moment is applied on the plug 70. Therefore, according to the present invention, the plug 70 is prevented from being curved from the joint portion between the plug 70 and the socket 100.

Note, in order to detach the plug 70 after the fluid supply operation has been completed, it is performed to pull the knob 11 thereby allowing a sliding the shaft 6. Thus, it is performed to allow the air supply port 7 to communicate with the air passage 10 and the communication passage 32, as shown in FIG. 7a. In this state, the air exhaust port 8 communicates with the air passage 9 and the communication passage 31. Then, when pneumatic pressure is supplied between the slider 25 and the annular base 3, the slider 25 is moved in front, realizing the condition shown in FIG. 6.

Then, the operator grasps the plug 70 by an operator's one hand, and pushes the sleeve 38 etc. back by the operator's other hand. Consequently, the engagement using the balls 34 is released, so that it becomes possible to draw the plug 70 out of the socket 100. As shown in FIG. 1 or the like, a taper 62 is formed on the edge part of the key plate 61 opposing the socket 100. Owing to the provision of the taper 62, the operator can easily insert operator's fingers in between the leading end of the sleeve 38 and the key plate 61. As a result, the operator can push the sleeve 38 backward with ease. Note, at the time of drawing the plug 70 etc., fluid (e.g. liquid) accumulated in the valve sleeve 15 is discharged through the drain joint 41 on the underside of the socket 100 appropriately.

Meanwhile, according to the present invention, there is provided an improper connection preventing mechanism for preventing a different plug from the specified plug 70 from being connected to the socket 100. Referring to FIG. 4 again, the first key bolt 68 and the second key bolt 69a have flattened tip portions projecting from the inner face of the key plate 61. On the contrary, the other second key bolts 69b to 69d do not have such flattened tip portions thereby to provide "blind-type" key bolts shortened by eliminating such tip portions. Thus, respective tips of the second key bolts 69b to 69d do not project from the inner face 63.

As shown in FIG. 4, in the case where both the first key bolt 68 and the second key bolt 69a project a plug 70 having the key grooves 77 formed in positions corresponding to these key bolts 68, 69a, is used. Such a plug 70 is inserted into the key plate 61 while the key bolts 68, 69a therein are engaged with the key grooves 77 of the plug 70. Once the key bolts 68, 69a are engaged with the key grooves 77, the plug 70 cannot rotate in the key plate 61.

According to the present invention, therefore, only the plug 70 having the key grooves 77 corresponding to the projecting key bolts 68, 69a is connected to the socket 100 through the key plate 61. In other words, none of the other plugs with the key grooves 77 in respective positions different from those of the above plug 70 nor a plug having no key groove 77 can be inserted into the key plate 61 of FIG. 4. Thus, in the present invention, the cooperation between the first and/or second key bolt and the key grooves 77 serves as the improper connection preventing mechanism.

Figure 9A:
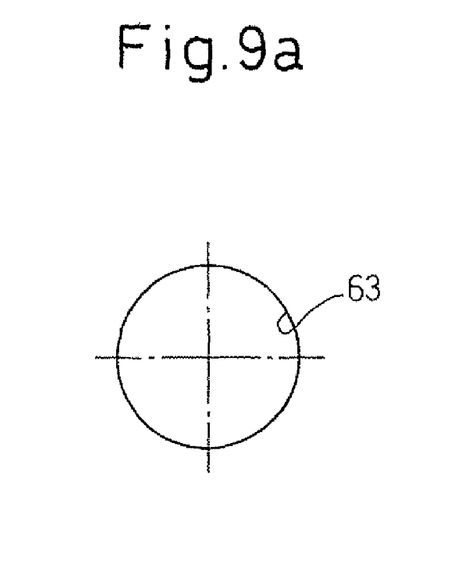

FIGS. 9a to 9d are views showing respective inner faces of the key plates schematically. In FIG. 9a, there is no key bolt projecting from the inner face 63 of the key plate 61. Thus, FIG. 9a illustrates a situation where the improper connection preventing mechanism is not provided, as reference.

Figure 9B:
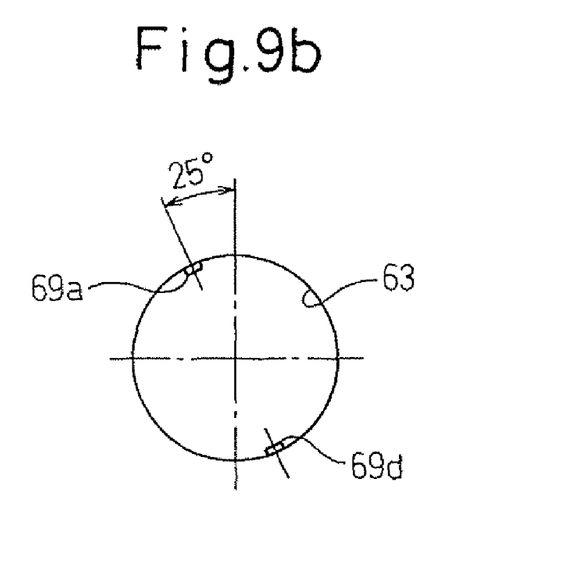
Figure 9C:
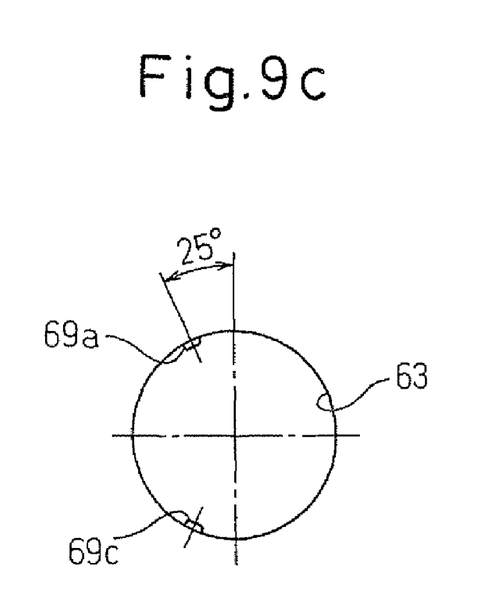
Figure 9D:
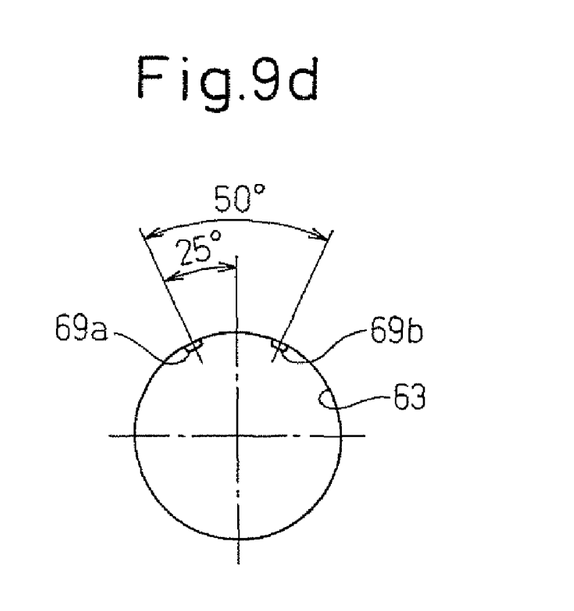

In FIGS. 9b to 9d, the first key bolt 68 is similar to the above-mentioned blind-type key bolt, whose tip does not project from the inner face 63. Further, in FIG. 9b, respective tips of the second key bolts 69a, 69d project from the inner face 63. In FIG. 9c, respective tips of the second key bolts 69a, 69c project from the inner face 63. In FIG. 9d, respective tips of the second key bolts 69a, 69b project from the inner face 63. It will be understood that a blind-type key bolt is used for each key bolts whose tip does not project from the inner face 63 throughout FIGS. 9a to 9d.

The plugs 70 used for the situations of FIGS. 9b to 9d are respectively formed with key grooves 77 corresponding to the illustrated key bolts. Thus, by differentiating the arrangements of the projecting key bolts and the associated key grooves 77 from each other, it is possible to prevent the plug 70 from being connected improperly even when supplying numerous kinds of chemical liquids. Note, it is obvious that even other structures (e.g. one structure having more second key bolts, another structure having the second key bolts arranged at different angles from those in the figures, and the other structure having a different number of key bolts engaging with the key grooves) would be included within the scope of the invention.

In the embodiment described with reference to the drawings, additionally, the attachment base 83 for the key plate 61 is attached to the base panel 81. However, if the socket 100 is provided with a flange 2 having dimensions equivalent to the base panel 81, then the attachment base 83 may be attached to the flange 2 directly.

It should be understood that the above-mentioned variations and various other modifications, deletions and additions can be made without departing from the spirit of the invention, although the present invention has been described by the typical embodiment.

DESCRIPTION OF NOTATIONS

| | |
|---|---|
| 1 | Housing |
| 2 | Flange |
| 2a | Narrow Part |
| 3 | Annular Base |
| 5 | Shaft Housing |
| 6 | Shaft |
| 7 | Air Supply Port |
| 8 | Air Exhaust Port |
| 9, 10 | Air Passage |
| 11 | knob |
| 12 | Stopper |
| 15 | Valve Sleeve |
| 16 | First Valve |
| 17 | Opening |
| 18 | Stopper |
| 19 | Spring |
| 20 | First Valve Seat |
| 22 | Communication Hole |
| 25 | Slider |
| 28 | Piston |
| 29 | Pneumatic Pressure Chamber |
| 31, 32 | Communication Passage |
| 33 | Ball Carrier Hole |
| 34 | Ball |
| 37 | Inner Collar |
| 38 | Sleeve |

| -continued | |
|---|---|
| 40 | Stopper |
| 41 | Drain Joint |
| 60 | Plug Support |
| 61 | Key Plate |
| 62 | Taper |
| 63 | Inner face |
| 64 | Opening |
| 65 | Reinforcing Bar |
| 67 | Fixing Bolt |
| 68 | First Key Bolt |
| 69a to 69d | Second Key Bolt |
| 70 | Plug |
| 70' | Pipe Conduit |
| 71 | Second Valve |
| 72 | Second Valve Seat |
| 73 | Communication Hole |
| 74 | Spring |
| 75 | Double Nut |
| 76a | Outer Slanted Face |
| 76b | Annular Recess |
| 77 | Key Groove |
| 78 | Inner Passage |
| 79 | Stopper |
| 80 | Panel |
| 81 | Base Panel |
| 82 | Bracket |
| 83 | Attachment Base |
| 85 | Key Plate Support |
| 100 | Socket |

The invention claimed is:

1. A fluid-transfer coupling device comprising:
a cylindrical slider slidably inserted into a cylindrical housing, the cylindrical slider containing a valve sleeve accommodating a valve which is adapted so as to open by pressure;
a piston formed at a rear end of the cylindrical slider so as to make a slide contact with an inner wall of the cylindrical housing, the piston being constructed so that entry and exit of pneumatic pressure on both sides of the piston allows the slider to be moved in the cylindrical housing;
engaging means arranged at a forward end of the cylindrical slider so as to engage with a plug to be connected to the cylindrical slider, the engaging means allowing the plug to be drawn up to an advanced end in the valve sleeve with a movement of the cylindrical slider; and
plug supporting means for supporting the plug on condition of being drawn up to the advanced end in the valve sleeve by the movement of the cylindrical slider,
wherein the plug supporting means is provided with an improper connection preventing mechanism for preventing other plugs except a specified plug from being connected to the fluid-transfer coupling device,
wherein the improper connection preventing mechanism includes at least one key groove formed on an outer circumferential face of the specified plug and a key for engagement with the key groove,
wherein the plug supporting means is formed with an opening into which the plug is inserted, and
wherein the plug supporting means is fixed in at least three positions around the opening.

2. The fluid-transfer coupling device of claim 1, wherein the plug supporting means is arranged in front of the forward end of the slider.

3. The fluid-transfer coupling device of claim 1, wherein the key of the improper connection preventing mechanism comprise a tip portion of a bolt projecting from an inner circumferential face of the opening.

4. The fluid-transfer coupling device of claim 1, wherein the plug supporting means has a taper formed on an edge part of the plug supporting means opposing the forward end of the slider.

5. The fluid-transfer coupling device of claim 1, wherein the fluid-transfer coupling device further includes a pneumatic pressure entry-and-exit mechanism that changes pneumatic pressures on both sides of the piston thereby to allow the slider to slide in the cylindrical housing.

6. A fluid-transfer coupling device comprising:

a cylindrical slider slidably inserted into a cylindrical housing, the cylindrical slider containing a valve sleeve accommodating a valve which is adapted so as to open by pressure;

a piston formed at a rear end of the cylindrical slider so as to make a slide contact with an inner wall of the cylindrical housing, the piston being constructed so that entry and exit of pneumatic pressure on both sides of the piston allows the slider to be moved in the cylindrical housing;

a mechanism arranged at a forward end of the cylindrical slider that is suitable to engage with a plug to be connected to the cylindrical slider, said mechanism allowing the plug to be drawn up to an advanced end in the valve sleeve with a movement of the cylindrical slider; and an apparatus that is suitable to support the plug on condition of being drawn up to the advanced end in the valve sleeve by the movement of the cylindrical slider, wherein said apparatus is provided with an improper connection preventing mechanism for preventing other plugs except a specified plug from being connected to the fluid-transfer coupling device, wherein the improper connection preventing mechanism includes at least one key groove formed on an outer circumferential face of the specified plug and a key for engagement with the key groove, wherein said apparatus is formed with an opening into which the plug is inserted, and wherein said apparatus is fixed in at least three positions around the opening.

7. The fluid-transfer coupling device of claim 6, wherein said apparatus that is suitable to support the plug is arranged in front of the forward end of the slider.

8. The fluid-transfer coupling device of claim 6, wherein the key of the improper connection preventing mechanism comprise a tip portion of a bolt projecting from an inner circumferential face of the opening.

9. The fluid-transfer coupling device of claim 6 wherein said apparatus that is suitable to support the plug has a taper formed on an edge part of said apparatus opposing the forward end of the slider.

10. The fluid-transfer coupling device of claim 6, wherein the fluid-transfer coupling device further includes a pneumatic pressure entry-and-exit mechanism that changes pneumatic pressures on both sides of the piston thereby to allow the slider to slide in the cylindrical housing.

* * * * *